United States Patent Office 3,440,153
Patented Apr. 22, 1969

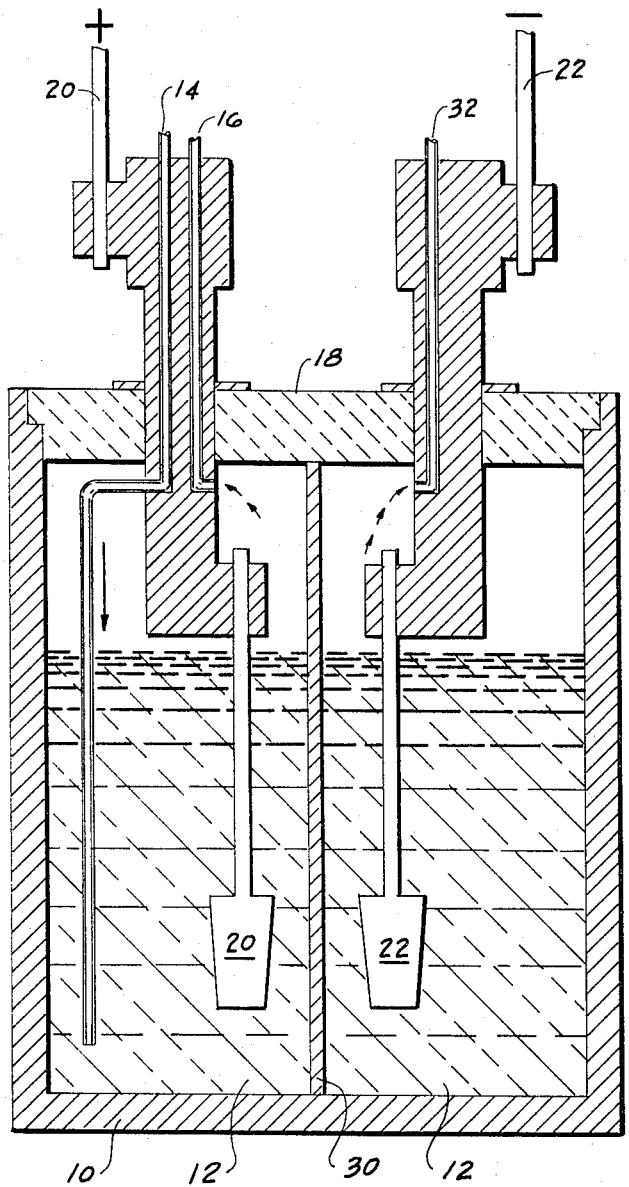

3,440,153
ELECTROLYTIC METHOD OF PRODUCING HIGHLY ORIENTED CRYSTALLINE STRUCTURES
Walter E. Arnoldi, West Hartford, Philip J. Birbara, Hazardville, and Sid Russell, Suffield, Conn., assignors to United Aircraft Corporation, East Hartford, Conn., a corporation of Delaware
Filed Apr. 24, 1964, Ser. No. 362,255
Int. Cl. C22d *3/06;* B01k *1/00*
U.S. Cl. 204—60     9 Claims

ABSTRACT OF THE DISCLOSURE

A method is provided for producing substantially pure chemical elements and compounds which exhibit a solid, highly oriented, anisotropic crystalline structure which comprises establishing a fused, sodium free electrolyte containing lithium as the predominant cation on a molar basis and having dissolved therein at least one oxyanion form of a desired element, contacting the electrolyte with an anode and a cathode, and passing direct current between the cathode and the anode to form lithium metal at the cathode, such that the lithium metal formed at the cathode reacts immediately with the oxyanion to form lithium oxide and to release the desired element at the cathode in order to form the desired crystalline structure.

---

This invention is directed to the production of substantially pure, highly oriented, anisotropic, polycrystalline forms of elements and compounds.

Techniques have been proposed and are available for producing such forms of elements and compounds which exhibit stable, solid, crystalline structures.

Typical of such prior art techniques is pyrolysis.

In pyrolytic processes, a suitable substratum is exposed to the vapors of compounds containing the desired elements, sometimes with a reducing gas such as hydrogen, and heated above the decomposition temperature of the compounds. The compounds decompose upon contact with the hot substratum to thereby deposit thereon the desired element or elements.

To obtain satisfactory deposition rates with pyrolysis, extremely high temperatures are ordinarily required, e.g., above 1000° C.

It is expensive to maintain substrate of any substantial size at temperatures of the magnitude indicated. Further, the types of substrata which can withstand such high temperatures are extremely limited. Also, as the pyrolytic reaction proceeds, it is difficult to control the deposition rate so as to produce an ordered structure in the deposit.

For all these reasons, pyrolysis has limited application as a technique for producing elements and compounds having highly oriented crystal structures.

According to the present invention, there are provided means and procedures whereby substantially pure, highly oriented, anisotropic polycrystalline forms of elements and compounds of the type described may be produced at comparatively low temperatures.

Further in accordance with the present invention, means and procedures are provided whereby substantially pure, impervious coatings of such highly oriented forms of elements and compounds may be tenaciously adhered as coatings to a wide variety of substrata.

Also in accordance with this invention there are provided means and procedures for producing highly oriented coatings of elements and compounds in relatively thin films, and also ultra-thin (e.g., less than 10 atomic layers) films.

Further in accordance with the invention, there are provided means and procedures for refining crude forms of elements to produce substantially pure, highly oriented, anisotropic polycrystalline forms of such elements.

As will appear hereinafter, products, including coatings and films, of the type described, may be produced by the electrolysis of fused, sodium-free electrolytes containing oxyanions and/or certain halide substituted oxyanions, of the desired elements, or of elements making up the desired compound, and, as the predominant cation on a molar basis, lithium.

A great advantage of the electrochemical deposition of this invention resides in the fact that the elements or compounds produced at the cathode are the result of a controllable growth that takes place on an orderly atomic or molecular scale. The electrochemically produced elements and compounds approach theoretical density and are non-porous.

The products of this invention have crystalline structures which are characteristically anisotropic in thermal, electrical, mechanical and other properties.

Because of their anisotropic characteristics, the products of this invention find utility in rocket and space technology, in solid state electronics, as protective coatings, thin films, and the like.

To produce the highly oriented elements and compounds, an anode and a cathode are immersed in a fused electrolyte, and direct current is passed therebetween.

The fused electrolyte comprises oxyanions and/or halide (e.g., fluoride) substituted oxyanions of the elements to be produced, or of the elements making up the desired compounds. Typical oxyanions include carbonate, borate, silicate, nitrate, phosphate, arsenate, and the like, and include suitable halide substituted forms of such oxyanions.

When compounds are desired, a plurality of oxyanions, and/or halide substituted oxyanions, including mixtures of oxyanions and halide substituted oxyanions of each of the elements making up the desired compound may be used. If desired, a salt other than the oxyanion may be used as a substitute for one of the oxyanion salts.

In addition to the oxyanion or a plurality of oxyanions of the type described, the electrolyte will contain lithium as the predominant cation, and should also be sodium-free.

This invention is especially adaptable for the production of high temperature elements and compounds which exhibit a solid crystalline structure at temperatures above 1000° C., and more particularly to the production of substantially pure, highly oriented, anisotropic polycrystalline forms of such elements and compounds. Illustrative examples of such elements and compounds are listed in Table 1, Column 1. The oxyanion constituents of a typical electrolyte which may be used to produce such elements and compounds are described in Column 2. In Column 3, there are listed components of the electrolytes other than the designated oxyanions, and Column 4 contains the suggested electrolyte operating temperature.

TABLE 1

| Element or Compound Desired | Oxyanion Containing Constituent of Electrolyte | Other Components of Electrolyte | Temperature of Electrolyte (° C.) |
|---|---|---|---|
| Carbon | $Li_2CO_3$ | LiF, LiCl | 500–750 |
| Boron | $LiBO_2$ | LiF, LiCl | 600–900 |
| Silicon | $Li_2SiO_3$ | LiF, LiCl | 700–900 |
| Boron Carbide | $LiBO_2$, $Li_2CO_3$ | LiF, LiCl | 500–700 |
| Iron Carbide | $Li_2CO_3$, $LiFeO_2$ | LiF, LiCl | 600–750 |
| Tungsten Carbide | $Li_2CO_3$, $Li_2WO_4$ | LiF, LiCl | 600–750 |
| Silicon Carbide | $LiSiO_3$, $Li_2CO_3$ | LiF, LiCl | 600–750 |
| Chromium carbide | $Li_2CO_3$, $Li_2Cr_2O_4$ | LiF, LiCl | 600–750 |
| Beryllium boride | $LiBO_2$ | $BeCl_2$, LiF, LiCl | 450–700 |
| Silicon boride | $LiBO_2$, $Li_2SiO_3$ | LiF, LiCl | 850–1,000 |
| Vanadium boride | $LiBO_2$, $LiVO_3$ | LiF, LiCl | 700–1,000 |
| Chromium boride | $LiBO_2$, $Li_2CrO_4$ | LiF, LiCl | 700–1,000 |
| Iron boride | $LiBO_2$, $LiFeO_2$ | LiF, LiCl | 700–1,000 |
| Tantalum boride | $LiBO_2$, $Li_2TaF_7$ | LiF, LiCl | 700–1,000 |
| Boron nitride | $LiBO_2$, $LiNO_3$ | LiF, LiCl | 300–600 |

When a flow of direct current is maintained between a cathode and an anode immersed in a fused sodium-free electrolyte comprising oxyanions and/or halide substituted oxyanions of the type described and lithium as the predominant cation on a molar basis, lithium exerts a powerful reducing action at the cathode and in effect separates the desirable element of the oxyanion from its chemically bound oxygen, thereby causing the desired element to deposit at the cathode.

The cathodic reaction between lithium and the oxyanion may be described in simplified form by the equation:

$$2Li + [MO]^{-n} \rightarrow M\downarrow + Li_2O + ne \qquad (1)$$

where [MO] is a purely symbolic representation for the oxyanion, M the desirable element thereof, $n$ a small integer corresponding to the valence of the oxyanion, and $e$ an electron.

The invention will be particularly described with reference to the production of a highly oriented, anisotropic polycrystalline form of graphite. It should be understood that the principles to be described have general applicability to the production of oriented forms of elements and compounds of the type described in Table 1.

When graphite is desired, the oxyanion in the electrolyte will be a carbonate.

When a flow of direct current is provided between a cathode and an anode immersed in a fused, sodium-free electrolyte comprising a carbonate salt, the lithium as the predominant cation on a molar basis, the electrode reactions may be represented by the following equations:

$$\text{Cathode: } Li^+ + (e) \rightarrow Li \qquad (2)$$

$$\text{Anode: } CO_3^= \rightarrow CO_2 + \tfrac{1}{2}O_2 + 2e \qquad (3)$$

If a carbon anode is used, the oxygen liberated will react with the carbon anode to form additional carbon dioxide.

The carbon dioxide formed at the anode remains in the electrolyte, since it is highly soluble in an electrolyte containing free oxide ions.

If a carbon anode is not used, a vent can be provided for liberation of oxygen from the anode compartment of the cell, as will be made more clear hereinbelow. The cathiodic reaction product, Li, immediately reacts with the molten carbonate in the vicinity of the cathode to form carbon and lithium oxide according to the equation:

$$4Li + Li_2CO_3 \rightarrow C\downarrow + 3Li_2O \qquad (4)$$

or written ionically:

$$4Li + 2Li^+ + CO_3^= \rightarrow C\downarrow + 6Li^+ + 3O^= \qquad (5)$$

The lithium oxide reacts with carbon dioxide liberated at the anode to form carbonate according to the equation:

$$Li_2 + CO_2 \rightarrow Li_2CO_3 \qquad (6)$$

Written ionically, this equation becomes:

$$2Li^+ + O^= + CO_2 \rightarrow 2Li^+ + CO_3^= \qquad (7)$$

If desired, auxiliary carbon dioxide may be supplied to the cell.

As will be clear from Equations 5 and 7, oxide ions ($O^=$) are continually being generated (Equation 5) and depleted (Equation 7) from the electrolyte in the vicinity of the cathode.

Care should be exercised to maintain the current density low enough to avoid building up oxide ions at the cathode (Equation 5) faster than the rate at which oxide ions are depleted by absorption of carbon dioxide (Equation 7). Such a rate imbalance would eventually lead to a concentration of oxide as well as other ions in the vicinity of the cathode exceeding the electrolyte solubility for such ions. When the solubility limit of the electrolyte is exceeded, deposition of electrolyte salts, e.g., lithium oxide, at the cathode occurs. Co-deposits of electrolyte salts with the desired element or compound at the cathode will be referred to herein as clinker.

Clinker formation at the cathode prevents deposition of the desirable forms of the elements and compounds, e.g., carbon, and must be eliminated in order to accomplish the objectives of this invention.

Additives which increase the solubility of the electrolyte for the ions which accumulate in the vicinity of the cathode and which at the same time do not interfere with the electrolytic reactions are helpful in avoiding cathodic deposition of electrolyte salts.

When the cell is properly balanced, carbon tenaciously deposits at the cathode in the form of a highly oriented, anisotropic polycrystalline material which has a structure substantially identical to graphite grown pyrolytically at 2100° C. or higher, by comparison on the basis of X-ray diffraction analysis. Such analysis indicates strongly ordered crystallites with reference to the $c$-axis, while $a$ and $b$ axes are much less distinct. Spacing of atomic layers along the $c$ axis has been estimated at 3.37 Angstroms from this analysis from which it is readily inferred that graphite approaching the ideal, with 3.35 Angstrom spacing, can be produced.

In addition to monitoring current density, other means for regulating oxide concentration in the vicinity of the cathode and/or preventing or reducing salt crystallization at the cathode include introducing non-process interfering cations to partially replace lithium, e.g., K and Ba, as described infra; introducing oxide "getter" elements such as boron as borate or fluoborate compounds; mechanical rotation of the cathode; and agitation of the electrolyte in the vicinity of the cathode.

Additives other than boron compounds which increase the electrolyte solubility for the salts which accumulate in the vicinity of the cathode are also helpful in preventing clinker formation, as has been described supra. Care should be exercised in selecting such additives however to insure that they do not interfere with the main ionic reactions occurring at the cathode.

In carrying out the electrolysis, the presence of contaminating metal ions, which may be present initially in the electrolyte salts or which may be derived from the container vessel or electrodes should be avoided. In this connection, use of high purity salts in preparing the fused electrolyte, and careful selection of materials of cell construction is recommended.

In preparing the electrolytes, it is essential that lithium be present in a preponderant amount on a molar basis. Alkali and alkaline earth metals, e.g., barium and potassium, may be tolerated and in some instances are beneficial, as indicated above.

The presence of sodium however is deleterious, since it prevents adherence of the deposit to the cathode. As a result, with sodium containing melts, the cathodic deposit, rather than adhering tenaciously to the cathode, may be suspended in the electrolyte, may in part float to the surface, or may be precipitated, depending upon specific physical circumstances.

The presence of halides, e.g., chlorides and fluorides, is beneficial in reducing the melting point of the electrolyte and can be utilized to good advantage. Other "antifreeze" agents for lowering the melting point of the fused electrolyte may also be used, however, so long as they do not interfere with the necessary electrode reactions.

The temperature at which the cell is operated will depend largely upon the electrolyte composition. In general, however, cell temperature will be maintained between about 500 and 750° C., for the production of graphite.

Lithium carbonate in combination with lithium fluoride and/or lithium chloride are particularly effective as electrolytes and are preferred for use herein when polycrystalline graphite is desired.

The addition of boron oxide to the melt is also helpful and permits the utilization of higher current densities. Molar ratios of boron oxide to lithium carbonate may range up to 1:4, preferably about 1:6.

Substantially the same molar ratios apply to the other additives described.

The molar ratio of halide to carbonate may be relatively higher, however, ratios up to equimolar or even higher, e.g., 1:8, being suitable.

Successful operation has been achieved at current densities of less than 20 milliamperes/cm.$^2$ of cathode surface. Higher current densities, e.g., 1–2 amperes/cm.$^2$ of cathode surface are however contemplated.

The voltage requirements depend upon current density, temperature and electrolyte composition, but will always be above 1 volt if oxygen is released at the anode.

Although the electrolysis is a direct current operation, an A-C ripple and/or cyclic cut-off or reversal may be superimposed thereon.

Typical operating conditions which may be employed to produce highly oriented, anisotropic, polycrystalline graphite in accordance with the foregoing teachings are described in Tables 2 and 3 below.

TABLE 2

| | Melt Composition | | |
|---|---|---|---|
| | Li$_2$CO$_3$-LiF Equimolar | Li$_2$CO$_3$-LiF Equimolar | Li$_2$CO$_3$, 4 moles<br>LiCl, 4 moles<br>LiF, 4 moles<br>B$_2$O$_3$, 1 mole |
| | Temperature, ° C. | | |
| | 670 | 670 | 645 |
| Materials: | | | |
| Anode | Platinum Wire .060" | Gold Plate over Gold Braze | Gold-15% Ni .040" Wire. |
| Cathode | Nickel ¼" rod | Nickel sheet (50 cm.$^2$) | Nickel Sheet (570 cm.$^2$). |
| Container | Stainless Steel | Stainless Steel | Stainless Steel. |
| Ref. Electrode | None | None | Gold. |
| Time | 22 hrs | 64 hrs | 6 hrs. |
| Electrical Data: | | | |
| Duty Cycle | Interrupted Current 4.2% | AC superimposed over DC | Steady Current. |
| Frequency | 30 cps | 50 kc | |
| On-Duty Current Density | .4 A./cm.$^2$ | Max. 30 ma./cm.$^2$; Min. 10 ma./cm.$^2$ | 17.5 ma./cm.$^2$. |
| On-Duty Voltage | 2.3 v | AC 38 mv., DC 1.9 v | Ref. to Cathode Ave., .64 v., Ref. to Anode Ave., .9 v. |
| Off-Duty Voltage | 1.65 v | | |
| Cathodic Protection (container) | 20 ma | 150 ma | 110 ma. |

TABLE 3

| | Melt Composition | | | |
|---|---|---|---|---|
| | Li$_2$CO$_3$-LiF Equimolar | Li$_2$CO$_3$-LiF Equimolar | Li$_2$CO$_3$, 6 moles<br>LiCl, 6 moles<br>LiF, 6 moles<br>B$_2$O$_3$, 1.5 moles | Li$_2$CO$_3$, 1 mole<br>LiF, 1.5 moles |
| | Temperature, °C. | | | |
| | 670 | 670 | 670 | 680 |
| Materials: | | | | |
| Anode | 1" Diameter carbon rod | 1" Diameter carbon rod | Carbon | 1" Diameter Bttry. Carbon.<br>Carbon. |
| Cathode | Nickel ³⁄₁₆" rod | Nickel ³⁄₁₆" Rod $^1$ | Nickel ¼" diameter | Ductile Iron Modular Cast Iron ⁵⁄₁₆" rod. |
| Container | Stainless Steel | Stainless Steel | Stainless Steel | Stainless Steel. |
| Ref. Electrode | Platinum | Platinum | Platinum | Gold. |
| Time | 21 hrs | 25 hrs | 20 min | 24 hrs. |
| Electrical Data: | | | | |
| Duty Cycle | Interrupted current 5.7% | Steady current | Steady current | Steady current. |
| Frequency | 30 cps | | | |
| On-Duty Current Density | .615 A./cm.$^2$ | (1) 1.8 ma./cm.$^2$; (2) 4.6 ma./cm.$^2$; (3) 18.5 ma./cm.$^2$ | 1.0 A./cm.$^2$ | 10 ma./cm.$^2$. |
| On-Duty Voltage | 2.75 v | Ref. to Cathode, .34 v., .45 v., .42 v.; Ref. to Anode, Ave. .17 v. | Ref. to Cathode, Ave. .30 v.; Ref. to Anode Ave. .10 v. | Ref. to Cathode, Ave. .7 v.; Ref. to Anode, Ave. .07 v. |
| Off-Duty Voltage | 1.1 (terminal), .75 (Ref. to Cathode). | Ref. to Cathode, .27 v., .35 v., .45 v.; Ref. to Anode, Ave. .11 v. | | |
| Cathodic Protection (container) | 20 ma | 20 ma | 20 ma | 25 ma. |

$^1$ Three simultaneous specimens.

The volume of oxygen produced at the anode and the weight of carbon deposited at the cathode were determined as a function of the number of coulombs passed in certain experiments. When the anode and cathode were adequately shielded from one another in other experiments similar to those shown in the above table, substantially 100 percent electrolytic current efficiency was observed with a complete material balance.

In the runs described in Tables 2 and 3, carbon tenaciously deposited at the cathode in the form of a highly oriented, anisotropic polycrystalline material which has a structure substantially identical to graphite grown pyrolytically at 2100° C. or higher, by comparison on the basis of X-ray diffraction analysis. Such analysis indicates strongly ordered crystallites with reference to the $c$-axis, while $a$ and $b$ axes are much less distinct. Spacing of atomic layers along the $c$ axis has been estimated at 3.37 Angstroms from this analysis from which it is readily inferred that graphite approaching the ideal, with 3.35 Angstrom spacing, can be produced.

The single figure of the drawing is a schematic illustration showing an electrolysis cell suitable for practicing the invention.

Referring to the drawing, 10 denotes a container of any suitable material partially filled with a fused electrolyte 12. The vessel 10 is closed by a suitable capping means 18. Extending through the capping means and into the electrolyte 12 is a cathode 22 and an anode 20 connected to a suitable direct current power supply (not shown). A suitable porous or perforated barrier 30 separates the anode compartment from the cathode compartment. The presence of the barrier is optional. However, use of the barrier is recommended in order to prevent oxygen generated at the anode from bubbling through the electrolyte and oxidizing the material deposited at the cathode.

When utilized to manufacture polycrystalline graphite, carbon dioxide may be bubbled through the electrolyte via a suitable conduit 14 as shown. A suitable vent or tube 32 may also be provided above the cathode compartment. Tube 16 could be used to purge the cell with inert gas if barrier 30 is removed. Tube 16 could also be used to remove oxygen if produced at the anode. As described above, if the anode is made of carbon, the oxygen ions electrically discharged at the anode will react with the carbon anode. In this event, oxygen will not be released from the anode compartment and the carbon dioxide will remain in solution in the electrolyte.

The electrolyte 12 may be heated to fusion by any suitable means, for example, by induction heating. With adequate thermal insulation energy losses incidental to electrolysis may be sufficient to maintain the desired operating temperature without further addition of heat.

Care should be used in selecting materials of construction for the vessel housing the electrolyte and also for the electrodes because of the extreme corrosiveness of the fused electrolyte being employed.

Suitable materials for use as the containing vessel include gold, gold-paladium, gold-nickel and graphite. Stainless steel is also suitable and preferred for use if cathodically protected. Cathodic protection may take the form of a relatively small ancillary current. This protective current also serves to maintain the melt more free from various contaminating ions.

Anode materials suitable for use, if oxygen is to be released, include gold, either in pure form or alloyed with small amounts of nickel or palladium. Alternatively, the deposited elements may be used as the anode material. Cathode materials suitable for use include nickel, stainless steel, ductile iron and cobalt.

In utilizing the teachings described, highly oriented forms of such elements as silicon may be produced in the same manner as carbon by substituting silicate oxyanions for carbonate oxyanions in the electrolyte.

Elements such as carbon, silicon, and the like, produced by the controlled electrodeposition technique described are of great interest because of the unusual thermal, electrical and mechanical properties possessed by the resulting products.

Electrodeposition of high oriented, anisotropic, polycrystalline compounds such as carbides, borides, nitrides, silicides, phosphides, arsenides, and the like, of transition elements and of carbon, boron, silicon and beryllium is also feasible utilizing the principles described herein and utilizing electrolytes of the type described in Table 1.

Such compounds may be produced by electrolysis of a fused salt mixture comprising both of the elements involved in the form of oxyanions or with only one of them as a cation while the other is an oxyanion, the primary cation being lithium. Care should be exercised to establish and use appropriate quantitative proportions of the electrolyte constituents in order that the elements involved will form the desired compound. As indicated above, halide substituted oxyanions may be used in whole or in part for oxyanions.

A typical co-reduction of a pair of oxyanions to produce a highly oriented compound at the cathode is represented by the following equation involving carbon dioxide and boric oxide:

$$CO_2 + 2B_2O_3 \rightarrow B_4C + 4O_2 \qquad (8)$$

The process of this invention, in addition to being used to produce cathodic depositions of extremely oriented, anisotropic polycrystalline forms of the elements and compounds as described can also be utilized to great advantage in coating base materials and/or alloys with highly organized forms of elements and compounds of the type described in Table 1.

In cases where deposition of the desired compound on a particular substratum presents adhesion difficulties, it is apparent that coating can be achieved by depositing on a surface which itself constitutes a coating on the surface of another metal; for example, an electroplate of nickel on a base of titanium.

In this manner, base metals and alloys can readily be provided with coatings of any desired thickness of the substantially pure, highly oriented, anisotropic polycrystalline forms of the elements and compounds.

This process can be made a continuous one by providing for the continuous replenishment of the electrolyte by addition of electrolyte constituents depleted at the electrodes, or by the use, as the anode or anodes, of such constituents in crude form.

Since the electrolysis proceeds at low temperature, e.g., less than 1000° C. or between about 500 and 1000° C., as compared, for example, to temperatures above 1000° C. for conventional pyrolytic techniques, it will readily be appreciated that the instant procedure permits coating of highly oriented compounds and elements of the type described on substrata materials which, because of low melting points or other heat sensitive properties, could not be coated heretofore with such elements or compounds.

The instant procedure could also be adapted to manufacture fibers of elements and compounds in the highly oriented form described, and could also be used to coat fibers continuously. Thus, for example, a continuous filament or fiber to be coated could be employed as the cathode and drawn continuously through fused electrolytes of the type described.

Of commercial importance is the fact that uniform coating thicknesses can be achieved for odd shaped objects by practice of this invention.

While it is obviously applicable to a number of different areas, it should be noted that the electrodeposition techniques disclosed complement vacuum deposition techniques. Of considerable importance is the fact that the temperatures at which substrata can be coated with carbon, silicon, carbides, borides, nitrides, silicides and the like, using the electrolytic technique described, are considerably lower than those encountered in vapor-phase decomposition procedures.

Besides graphite in the form described supra, particularly important products which may be produced by this invention and their application are described below:

(1) Boron—high strength fiber, either by itself or as a thin coating on fine wire.

(2) Boron carbide—high strength coating.

(3) Boron nitride—non-conductors of electricity, useful as very thin film in electronics; also as non-porous, chemically unreactive coating for moderately high temperatures, such as gas turbine blades.

(4) Tungsten carbide—high strength filament or coating.

(5) Silicon boride—an ionic conductor, suitable as a solid electrolyte for a high temperature fuel cell.

The invention in its broader aspects is not limited to the specific steps, methods, combinations and mechanisms described but departures may be made therefrom within the scope of the accompanying claims without departing from the principles of the invention and without sacrificing its chief advantages.

What is claimed:

1. A method for producing substantially pure boron which exhibits a solid, highly oriented, anisotropic crystalline structure which comprises establishing a fused, sodium-free electrolyte containing lithium as the predominant cation on a molar basis and having dissolved therein a borate oxyanion, contacting the electrolyte with an anode and a cathode, and passing direct current between the cathode and the anode to form lithium metal at the cathode, such that the lithium metal formed at the cathode reacts immediately with the oxyanion to form lithium oxide and to release boron at the cathode in order to form the desired crystalline structure.

2. The method for producing substantially pure silicon according to the method of claim 1 wherein the oxyanion dissolved in the electrolyte is a silicate and the element deposited at the cathode is silicon.

3. The method for producing substantially pure boron according to the method of claim 1, wherein the oxyanion is a halide substituted oxyanion.

4. The method for producing substantially pure silicon according to the method of claim 2 wherein the oxyanion is a halide substituted oxyanion.

5. A method for producing substantially pure, highly oriented, anisotropic polycrystalline forms of a compound selected from the group consisting of carbides, nitrides, borides, phosphides, arsenides and silicides, of a first member selected from the group consisting of transition elements, carbon, boron, silicon and beryllium, which comprises establishing a fused, sodium-free electrolyte containing lithium as the predominant cation on a molar basis and having dissolved therein an oxyanion of the first member and an oxyanion of a second member selected from the group consisting of carbon, boron, nitrogen, silicon, phosphorous, and arsenic, contacting the electrolyte with an anode and a cathode, and passing direct current between the cathode and the anode to form oxygen at the anode and lithium metal at the cathode, such that the lithium metal formed at the cathode simultaneously reduces the said oxyanions so as to form said desired compound on the cathode.

6. The method of claim 5 wherein the oxyanion of said first member is a halide substituted oxyanion.

7. The method of claim 5 wherein the oxyanion of said second member is a halide substituted oxyanion.

8. A method for producing substantially pure, highly oriented, anisotropic polycrystalline forms of a compound selected from the group consisting of carbides, nitrides, borides, phosphides, arsenides and silicides, of a first member selected from the group consisting of transition elements, carbon, boron, silicon, and beryllium, which comprises establishing a fused, sodium-free electrolyte containing lithium as the predominant cation on a molar basis and having dissolved therein a salt of the first member and an oxyanion of a second member selected from the group consisting of carbon, boron, nitrogen, silicon, phosphorous, and arsenic, contacting the electrolyte with an anode and a cathode, and passing direct current between the cathode and the anode to form oxygen at the anode and lithium metal at the cathode, such that the lithium metal formed at the cathode reduces the oxyanion of the second member while the salt of the first member is electrolytically reduced so as to form said desired compound on the cathode.

9. The method of claim 8 wherein the oxyanion of the second member is halide substituted oxyanion.

References Cited

UNITED STATES PATENTS

| 3,030,284 | 4/1962 | Fullerton | 204—60 |
| 3,085,053 | 4/1963 | Taylor | 204—60 |
| 3,173,849 | 3/1965 | Shearer et al. | 204—60 |

OTHER REFERENCES

Gore, G., Electrodeposition of Carbon etc., Chemical News, Sept. 5, 1884, pp. 113–114.

JOHN H. MACK, *Primary Examiner.*

H. M. FLOURNOY, *Assistant Examiner.*

U.S. Cl. X.R.

204—61